(12) United States Patent
Finn et al.

(10) Patent No.: US 9,571,733 B2
(45) Date of Patent: Feb. 14, 2017

(54) IMAGE CAPTURING

(75) Inventors: Harry John Finn, Lytham St Annes (GB); Andrew Christopher Tebay, Kendal (GB); David Robert Parker, Kirkham (GB); Simon Graham Stockton, Carnforth (GB)

(73) Assignee: BAE SYSTEMS PLC, London (GB)

( * ) Notice: Subject to any disclaimer, the term of this patent is extended or adjusted under 35 U.S.C. 154(b) by 607 days.

(21) Appl. No.: 13/985,015

(22) PCT Filed: Feb. 7, 2012

(86) PCT No.: PCT/GB2012/050264
§ 371 (c)(1),
(2), (4) Date: Aug. 12, 2013

(87) PCT Pub. No.: WO2012/107752
PCT Pub. Date: Aug. 16, 2012

(65) Prior Publication Data
US 2013/0321635 A1    Dec. 5, 2013

(30) Foreign Application Priority Data

Feb. 10, 2011 (EP) .................................. 11275025
Feb. 10, 2011 (GB) .................................. 1102293.6

(51) Int. Cl.
*H04N 5/232* (2006.01)
*G01C 11/02* (2006.01)
(Continued)

(52) U.S. Cl.
CPC ........... *H04N 5/23238* (2013.01); *G01C 11/02* (2013.01); *H04N 7/188* (2013.01); *G03B 37/04* (2013.01)

(58) Field of Classification Search
CPC .............................. B64D 47/08; G01C 11/025
See application file for complete search history.

(56) References Cited

U.S. PATENT DOCUMENTS 4,326,218 A    4/1982   Coutta et al.
5,668,593 A    9/1997   Lareau et al.
(Continued)

FOREIGN PATENT DOCUMENTS

JP      2000-350190 A    12/2000
WO      WO 96/41480 A1   12/1996
(Continued)

OTHER PUBLICATIONS

Notification Concerning Transmittal of Copy of International Preliminary Report on Patentability (Forms PCT/IB/326 and PCT/IB/373) and the Written Opinion of the International Searching Authority (Form PCT/ISA/237) issued on Aug. 22, 2013, by the International Bureau of WIPO in corresponding International Application No. PCT/GB2012/050264. (6 pages).
(Continued)

*Primary Examiner* — Peter D Le
(74) *Attorney, Agent, or Firm* — Maine Cernota & Rardin

(57) ABSTRACT

A camera array and method are disclosed for capturing and processing images of an area of terrain. For each of a plurality of time-steps within a time period, using each of a plurality of cameras in a camera array, an exemplary method includes: generating an image of a respective portion of terrain, wherein the cameras in the camera array have substantially fixed positions relative to each other, and the portions of terrain are such that the whole of the area of terrain has been imaged by the end of the time period; selecting a subset of the images such that the whole of the terrain is covered by the portions of the terrain in the images in the subset; and for an image not in the subset, if an object of interest is in that image, extracting a sub-image containing the object from that image.

20 Claims, 7 Drawing Sheets

(51) Int. Cl.
*H04N 7/18* (2006.01)
*G03B 37/04* (2006.01)

(56) References Cited

U.S. PATENT DOCUMENTS

| | | | |
|---|---|---|---|
| 6,130,705 | A | 10/2000 | Lareau et al. |
| 6,374,047 | B1 | 4/2002 | Beran et al. |
| 2004/0119020 | A1 | 6/2004 | Bodkin |
| 2006/0077255 | A1 | 4/2006 | Cheng |
| 2006/0208193 | A1 | 9/2006 | Bodkin |
| 2007/0126867 | A1 | 6/2007 | McCutchen |
| 2009/0015674 | A1 | 1/2009 | Alley et al. |
| 2009/0256909 | A1* | 10/2009 | Nixon .......... B64D 47/08 348/144 |
| 2010/0245571 | A1* | 9/2010 | DeVoe .......... G01C 11/06 348/145 |
| 2010/0283988 | A1 | 11/2010 | Mosier et al. |
| 2012/0093361 | A1* | 4/2012 | Huang .......... G06T 7/208 382/103 |

FOREIGN PATENT DOCUMENTS

| | | |
|---|---|---|
| WO | WO 00/03543 A1 | 1/2000 |
| WO | WO 2005/048605 A1 | 5/2005 |
| WO | WO 2011/004358 A1 | 1/2011 |

OTHER PUBLICATIONS

International Search Report (PCT/ISA/210) issued on Feb. 29, 2012, by the British Patent Office as the International Searching Authority for International Application No. PCT/GB2012/050264.
Search Report issued on May 26, 2011, by the British Patent Office for Application No. 1102293.6.
Search Report issued on Nov. 15, 2011, by the European Patent Office for Application No. 11275025.2.
International Search Report (PCT/ISA/210) issued on May 11, 2012, by the British Patent Office as the International Searching Authority for International Application No. PCT/GB2012/050263.
Search Report issued on May 25, 2011, by the British Patent Office for Application No. 1102291.0.
Search Report issued on Jul. 12, 2011, by the European Patent Office for Application No. 11275024.5.

* cited by examiner

IMAGE CAPTURING

FIELD OF THE INVENTION

The present invention relates to capturing and processing images.

BACKGROUND

Unmanned Air Vehicles (UAVs) are commonly used in surveillance operations.

Typically, UAVs tend to use gimballed cameras (i.e. cameras mounted on movable turrets) for reconnaissance.

However, only a small area of interest can be observed at any moment in time using such an approach. Furthermore, gimballed cameras tend to adversely affect the aerodynamic profile of an aircraft upon which it is mounted, e.g. by increasing drag.

SUMMARY OF THE INVENTION

In a first aspect, the present invention provides a method of capturing and processing images of an area of terrain, the method comprising: for each of a plurality of time-steps within a time period, using each of a plurality of cameras in a camera array, generating an image of a respective portion of terrain, wherein the cameras in the camera array have substantially fixed positions relative to each other, and the portions of terrain are such that the whole of the area of terrain has been imaged by the end of the time period; selecting a subset of the generated images such that the whole of the terrain is covered by the portions of the terrain in the images in the subset; and for an image not in the subset, if an object of interest is in that image, extracting a sub-image containing the object of interest from that image.

The method may further comprise storing the extracted sub-images.

Each camera in the array may be coupled to a respective storage means, and a step of selecting an image or storing a sub-image may comprise storing that image or sub-image at the storage means corresponding to the camera with which the image or sub-image was generated.

Each camera in the array may be coupled to a respective processor, and the step of extracting a sub-image from an image comprises using the processor corresponding to the camera with which the image was generated.

The method may further comprise transmitting the selected images from the camera array for use by an entity remote from the camera array.

The method may further comprise transmitting the sub-images images from the camera array for use by an entity remote from the camera array.

The method may further comprise selecting a particular object of interest, and using a further camera generating one or more further images of the selected object of interest.

The camera array may be mounted on a vehicle.

The vehicle may be an autonomous vehicle.

The further camera may be a gimballed camera that is movable relative to the cameras of the array.

The further camera may be movable relative to the cameras of the array; the further camera may be part of a camera assembly mounted on the vehicle; and the camera assembly comprises: a fixture; the further camera; and a mirror; wherein the fixture is arranged to be rotated about an axis; the further camera is mounted on the fixture such that the further camera has a substantially fixed position relative to the fixture; the mirror is mounted on the fixture such that, if the fixture rotates, the mirror rotates; the mirror is rotatable relative to the fixture about a further axis, the further axis being substantially perpendicular to the axis; and the further camera is arranged to detect electromagnetic radiation reflected by the mirror.

In a further aspect, the present invention provides a camera array comprising: a plurality of cameras having substantially fixed positions relative to each other, each camera being arranged to, for each of a plurality of time-steps within a time period, generate an image of a respective portion of terrain, wherein the portions of terrain are such that the whole of a given area of terrain has been imaged by the end of the time period; and one or more processors arranged to: select a subset of the generated images such that the area of terrain is covered by the portions of the terrain in the images in the subset; and for an image not in the subset, if an object of interest is in that image, extracting a sub-image containing the object of interest from that image.

In a further aspect, the present invention provides a vehicle comprising a camera array according to the above aspect.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
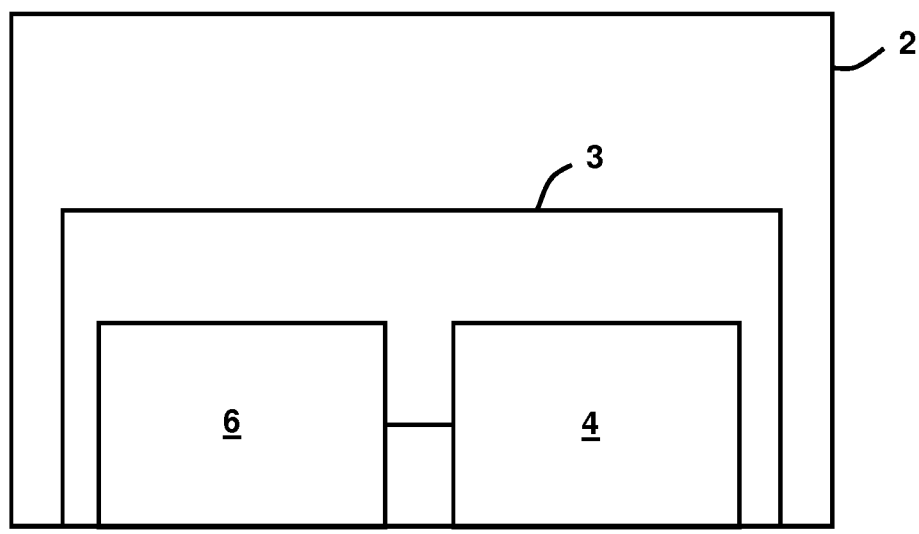
FIG. 1 is a schematic illustration (not to scale) of an aircraft in which an embodiment of a camera system is implemented.

FIG. 1 is a schematic illustration (not to scale) of an aircraft 2 in which an embodiment of a camera system 3 is implemented.

In this embodiment, the aircraft 2 is an unmanned air vehicle (UAV).

In this embodiment, the aircraft 2 comprises the camera system 3.

The camera system 3 comprises an array of camera modules, hereinafter referred to as "the array 4", and an assembly comprising a further camera, hereinafter referred to as "the assembly 6".

The array 4 is described in more detail later below with reference to FIG. 2.

The assembly 6 is described in more detail later below with reference to FIG. 3.

In this embodiment, the array 4 is coupled to the assembly such that two-way communication is possible between the array 4 and the assembly 6.

Figure 2:
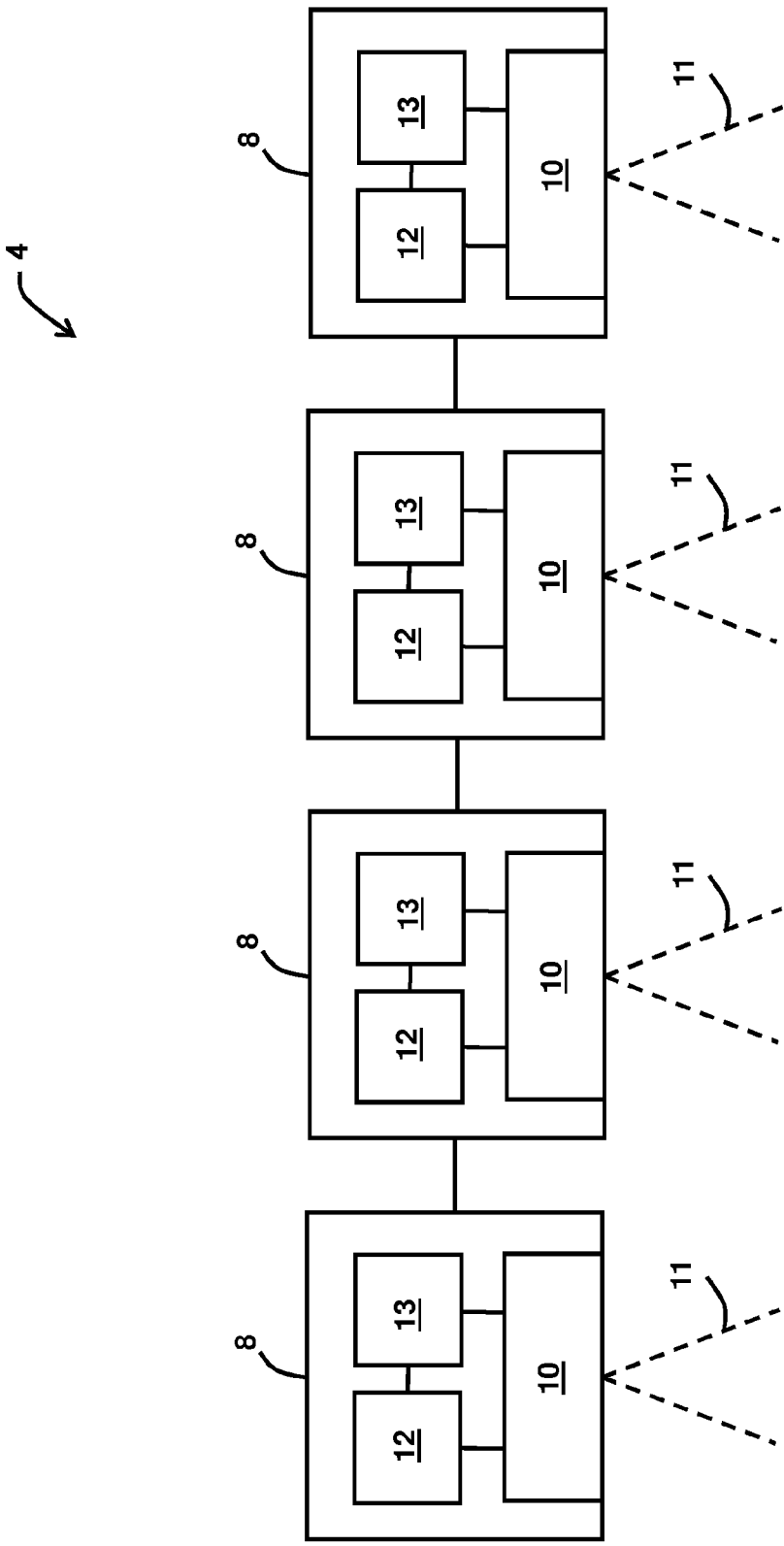
FIG. 2 is a schematic illustration (not to scale) of an array of cameras.

FIG. 2 is a schematic illustration (not to scale) of the array 4.

In this embodiment, the array 4 comprises four camera modules 8.

In this embodiment, each of the camera modules 8 comprises a camera 10, a processor 12, and a means for storing images which is hereinafter referred to as a "storage 13".

In this embodiment, each of the cameras 10 is coupled to the respective processor 12 and storage 13 such that images captured by a camera 10 are sent to the respective processor 12 and stored in the respective storage 13. Each of the cameras 10 is a high pixel count, wide field of view camera. Moreover, in this embodiment, each of the cameras 10 of the array 4 has a fixed position relative to the aircraft 2.

In this embodiment, the processors 12 of each of the camera modules 8 are coupled to one another such that two-way communication is possible between each of the processors 12.

In this embodiment, each of the cameras 10 are used to capture an image of an area of terrain that the aircraft 2 flies over, as described in more detail later below with reference to FIG. 4. The field of view of each of the cameras 10 is indicated in FIG. 2 by dotted lines and the reference numeral 11. Furthermore, in this embodiment the array 4 is coupled to a navigation device (not shown in the Figures) which accurately provides aircraft location (e.g. in terms of latitude, longitude and altitude) and aircraft orientation (e.g. in terms of aircraft roll, pitch, and yaw angles). Using the aircraft's location, the aircraft's orientation, the fixed position of the cameras 10 of the array 4 relative to the aircraft 2, and a ground elevation, a location for the image pixels that intercept the ground can be determined for any image taken, for example using a process such as geolocation. This provides a common reference (i.e. latitude, longitude and altitude) for objects are identified and distributed to other systems (as described in more details later below).

Figure 3:
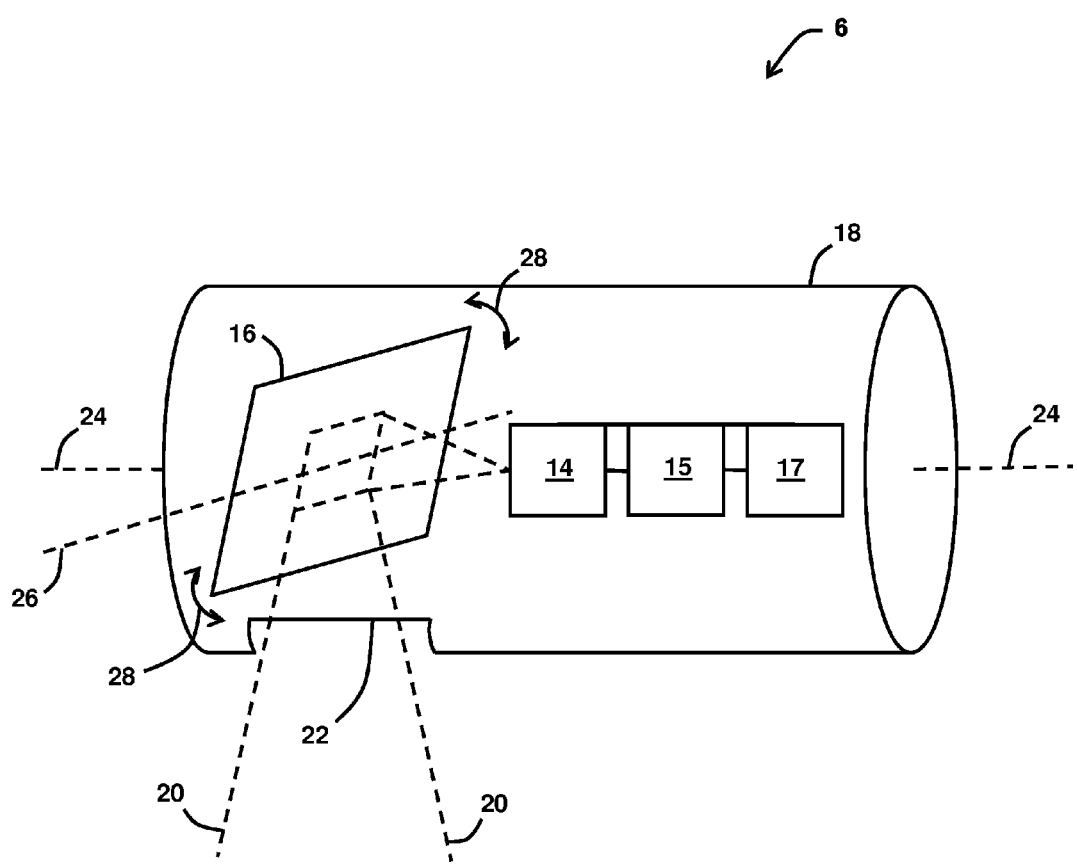
FIG. 3 is a schematic illustration (not to scale) of a camera assembly.

FIG. 3 is a schematic illustration (not to scale) of the assembly 6.

In this embodiment, the assembly 6 comprises a camera (hereinafter referred to as "the assembly camera 14"), a processor (hereinafter referred to as "the assembly processor 15") means for storing images which is (hereinafter referred to as the "assembly storage 17"), a mirror 16, and a drum 18.

In this embodiment, the assembly camera 14 is a high pixel count, narrow field of view camera. The assembly camera 14 is coupled to the assembly processor 15 such that images captured by the assembly camera 14 are sent to the assembly processor 15 and assembly storage 17.

In this embodiment, the assembly camera 14 is used to capture an image of an area of terrain that the aircraft 2 flies over, as described in more detail later below with reference to FIG. 4. The field of view of the assembly camera 14 is indicated in FIG. 3 by dotted lines and the reference numeral 20. Images are captured by the assembly camera 14 from light reflected from the terrain, passing through an aperture 22 in the drum 18, and reflected by the mirror 16 to the assembly camera 14.

In this embodiment, the assembly camera 14, the assembly processor 15, the assembly storage 17 and the mirror 16 are each mounted inside the drum 18.

In this embodiment, the assembly camera 14 has a substantially fixed position relative to the drum 18.

In this embodiment, the drum 18 is rotatable about its axis 24. The axis 24 of the drum 18 is indicated in FIG. 3 by dotted lines. Thus, the assembly camera 14, the assembly processor 15, the assembly storage 17 and the mirror 16 rotate with the drum 18. The rotation of the assembly 6 within the aircraft 2 about the axis 24 has an effect that is described in more detail later below with reference to FIG. 4.

In this embodiment, the drum 18 is mounted in the aircraft 2 such that the drum 18 is rotatable about its axis 24 relative to the aircraft 2. Furthermore, the drum 18 is mounted in the aircraft 2 such that the axis 24 of the drum 18 is substantially parallel to a roll axis of the aircraft 2, (i.e. to a direction of travel of the aircraft 2 when the aircraft 2 flies in a straight line).

In this embodiment, the mirror 16 is rotatable about an axis, hereinafter referred to as the "further axis" and indicated by a dotted line and the reference numeral 26 in FIG. 3. In this embodiment, the further axis 26 is substantially perpendicular to the axis 24. Furthermore, the further axis 26 is substantially fixed relative to the drum 18. Rotation of the mirror 16 about the further axis 26 provides that the mirror 16 is able to tilt back and forward (as indicated by solid arrows in FIG. 3 and indicated by the reference numeral 28). The tilting of the mirror 16 has an effect that is described in more detail later below with reference to FIG. 4.

Figure 4:
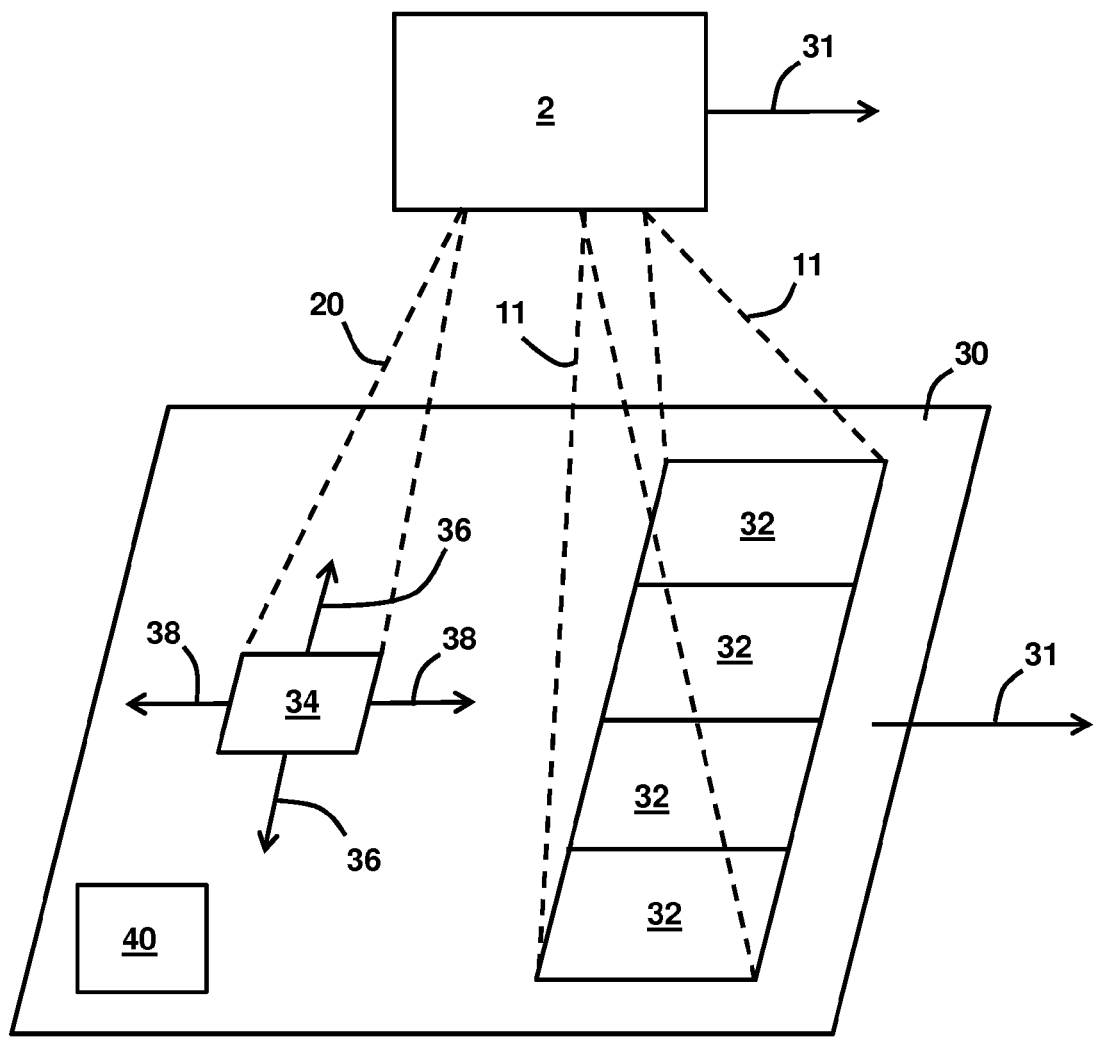
FIG. 4 is a schematic illustration (not to scale) of a scenario in which the aircraft will be used to implement the embodiment of the camera system.

FIG. 4 is a schematic illustration (not to scale) of a scenario in which the aircraft 2 will be used to implement the embodiment of the camera system 3. The method by which the camera system 3 is implemented is described in more detail later below with reference to FIGS. 5 and 7.

In this scenario, the aircraft 2 files over an area of terrain 30. The aircraft 2 flies in a direction of travel indicated in FIG. 4 by solid arrows and the reference numeral 31.

In this scenario, each of the respective cameras 10 of the array 4 takes an image of a respective portion of terrain 30. The process by which the portions of the terrain 30 are imaged using the array 4 is described in more detail later below with reference to FIG. 5. Each of the respective portions of the terrain is indicated in FIG. 4 by the reference numeral 32.

In this embodiment, the array 4 captures an image of a strip of the terrain. The strip of terrain is formed of four respective portions 32. An image is captured of each of the respective portions 32 by a respective camera 10 of the array 4. In this embodiment, the adjacent portions 32 partially overlap such that the strip of the terrain 30 imaged by the cameras 10 is continuous. In this embodiment, the strip of terrain formed by the portions is substantially perpendicular to the direction of travel 31 of the aircraft 2.

In this scenario, the cameras 10 take images of the terrain for a pre-determined time period, T. The time period T comprises time steps $t_1, \ldots, t_N$.

During the time period T, as the aircraft 2 flies over the terrain 30 the cameras 10 each capture an image at each time-step $t_i$ in T, i.e. discrete images are taken by each camera 10 of the terrain 30 such that a continuous image of the terrain 30 is captured over the time-period T.

The images captured by the cameras 10 of the array 4 are processed by the processors 12 of the array 4 as described in more detail later below with reference to FIG. 5.

Furthermore, in this scenario, the assembly camera 14 (of the assembly 6) takes an image of a portion of the terrain. The portion of the terrain of which an image is captured by the assembly camera 14 is hereinafter referred to as the "assembly portion" and is indicated in FIG. 4 by the reference numeral 34. As mentioned above, in this embodiment, the ground pixel footprint of the assembly camera 14 (i.e. the size of the assembly portion 34) is smaller than the ground pixel footprint of a portion 32.

In this embodiment, because the assembly camera 14 is mounted inside a drum 18 that is rotatable about the roll axis of the aircraft 2, the assembly portion 34 is movable relative to the portions 32. In particular, rotating the drum 18 about its axis 24, causes the position of the assembly portion 34 to move on the surface of the terrain 30 in a direction that is substantially perpendicular to the direction of travel 31 of the aircraft 2. Such directions are indicated by solid arrows and by reference numerals 36 in FIG. 4.

In this embodiment, because the mirror 16 in the assembly 6 is rotatable (i.e. can be tilted) about the further axis 26, the assembly portion 34 is movable relative to the portions 32. In particular, tilting the mirror 16 about the further axis 26, causes the position of the assembly portion 34 to move on the surface of the terrain 30 in a direction that is substantially parallel to the direction of travel 31 of the aircraft 2. Such directions are indicated by solid arrows and by reference numerals 38 in FIG. 4.

Thus, by rotating the drum 18 about the axis 24 by a particular amount, and by tilting the mirror 16 about the further axis 26 to have a particular angle within the drum 18, the position of the assembly portion 34 relative to the portions 32 may be changed. In this embodiment, the assembly portion 34 may overlap one or more portions 32 to any extent, or may not overlap a portion 32.

In this embodiment, the position of the assembly portion 34 on the terrain 30, i.e. the portion of the ground imaged by the assembly 6, is determined as described below with reference to FIG. 7. Also, the images captured by the assembly camera 14 are processed by the assembly processor 15 as described in more detail later below with reference to FIG. 7.

In this scenario, identities and locations of the images taken using the array 4 and the assembly 6 are sent from the aircraft 2 to a ground station 40. The aircraft 2 is in two-way communication with the ground station 40. Also, on request, processed images taken using the array 4 and the assembly 6 are sent from the aircraft 2 to a ground station 40.

Figure 5:
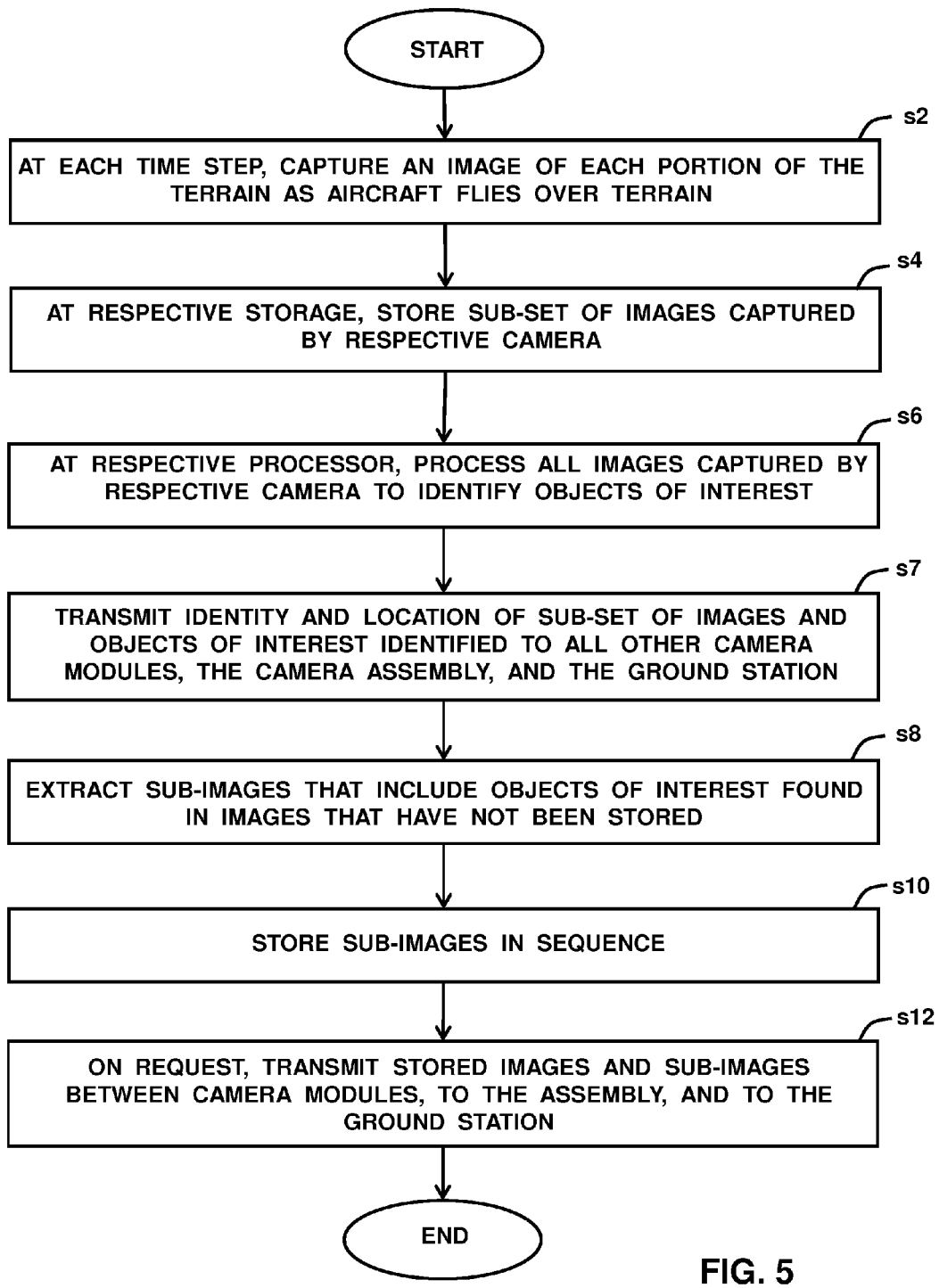
FIG. 5 is a process flow chart showing certain steps of a process by the camera system is implemented.

FIG. 5 is a process flow chart showing certain steps of a process by which the camera system 3 is implemented.

At step s2, an image of each respective portion 32 of the area of terrain 30 is captured by each respective camera 10 of the array 4. In this embodiment, images are taken by the cameras 10 at each time-step in the time-period T. In this embodiment, the cameras 10 of the array 4 take images as quickly as possible. In this embodiment, the cameras 10 each take images at a rate of 4 frames per second, i.e. the time-steps $t_1$ to $t_N$ are 4 s apart. However, in other embodiments, a camera may take images at a different rate.

The aircraft 2 files over the terrain 30 during the time period T. The cameras 10 have substantially fixed positions relative to the aircraft 2. Thus, in this embodiment, at each time-step the portions 32 of the terrain 30 have different positions on the surface of the terrain 30.

In this embodiment, a portion 32 imaged by a camera 10 at one time-step partially overlaps the portion 32 taken by the same camera at the next time-step. In particular, in this embodiment portions 32 imaged at some of the time-steps in the time period T are covered by images taken at other time-steps.

In other words, continuous coverage of the terrain 30 that the aircraft 2 flies over is provided by a sub-set of the images taken by the cameras 10. Depending on camera optic geometry, aircraft position, altitude and orientation and the terrain the rate at which images can be taken to achieve continuous coverage varies. In this embodiment, the cameras 10 of the array 4 take images at a rate of 4 frames per second. However, in this embodiment the rate at which images can be taken to achieve continuous coverage of the terrain 30 is a different (smaller) value, for example 0.2 frames per second (i.e. one image every 5 seconds).

In this embodiment, images taken by the cameras 10 of the array 4 at the time-steps $t_i$, $t_j$, $t_k$, and $t_l$ provide a continuous image of the terrain 30 that the aircraft 2 flies over in the time period T. The set of images taken at the time-steps $t_i$, $t_j$, $t_k$, and $t_l$ is a sub-set of the set of images taken at the time-steps $t_1, \ldots, t_N$.

The portions 32 of the terrain 30 that images are taken of between the time-steps $t_i$ and $t_j$ are covered by the images taken at $t_i$ and $t_j$. Likewise, the portions 32 of the terrain 30 that images are taken of between the time-steps $t_j$ and $t_k$ are covered by the images taken at $t_j$ and $t_k$. Likewise, the portions 32 of the terrain 30 that images are taken of between the time-steps $t_k$ and $t_l$ are covered by the images taken at $t_k$ and $t_l$.

Thus, in this embodiment, a substantially complete image of the surface of the terrain 30 under the aircraft 2 during the time period T is captured using the cameras 10 of the array 4. In other words, contiguous coverage of the surface of the terrain 30 under the aircraft's flight path is provided over the time period T.

At step s4, the sub-set of the images that provide a continuous image of the terrain 30 that the aircraft 2 flies over in the time period T are stored at the storages 13.

In this embodiment, images taken by a camera 10 at each of the time-steps $t_i$, $t_j$, $t_k$, and $t_l$ are sent to, and stored at, the respective storage 13 for that camera 10. The images taken at time-steps other than $t_i$, $t_j$, $t_k$, and $t_l$, which may be conveniently referred to as "intermediate images", are not stored at this stage.

Figure 6:
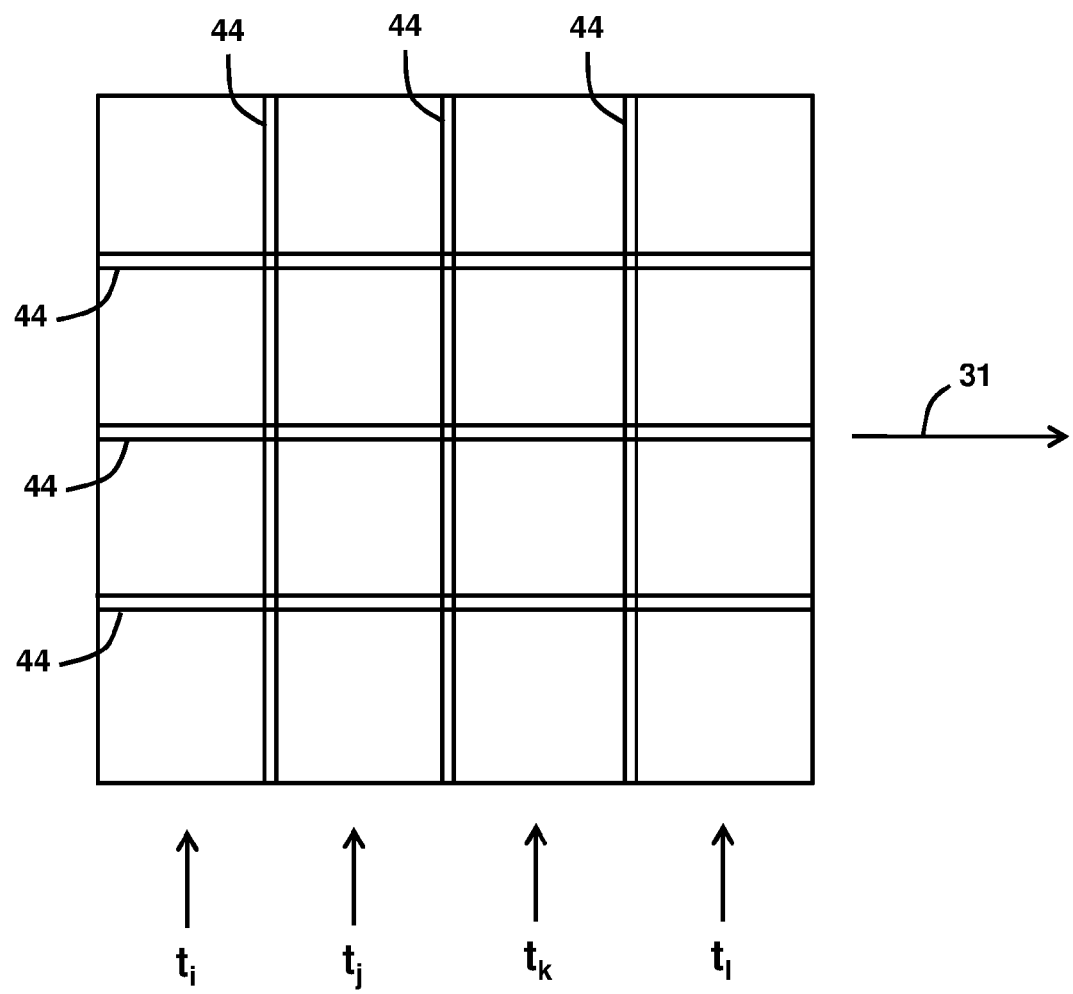
FIG. 6 is a schematic illustration (not to scale) of the images captured at step s2 of the process shown in FIG. 5.

FIG. 6 is a schematic illustration (not to scale) of the images stored at step s4. In FIG. 6, the rows of four images taken by the four cameras 10 of the array 4 at each of the time steps $t_i$, $t_j$, $t_k$, and $t_l$ are indicated. Overlaps between the images are indicated in FIG. 6 by the reference numeral 44.

At step s6, all the images captured at step s2 by a camera 10 (i.e. at each time-step) are sent to the processor 12 corresponding to that camera 10. The images may be sent as they are captured by the camera 10, or e.g. after a certain number of images have been captured. The images received by the processors 12 are processed to identify objects of interest in those images. In this embodiment, a conventional object identification process is implemented, for example a feature extraction, or change detection process.

In this embodiment, each object that is identified is assigned, by a processor 12, an object ID, such that the objects can be identified at later stages.

At step s7, each camera module 8 transmits the identity and location of each subset of images stored in that camera module 8, and the identity and location of all the objects of interest identified by that camera module 8 (at step s6 above), to each of the other camera modules 8, the assembly 6, and the ground station 40.

At step s8, from each image in which an object of interest has been identified at step s6, a sub-image is extracted containing the object of interest by the processor 12 corresponding to the camera 10 that captured that image.

The sub-images that include the identified objects may be extracted using any appropriate process.

At step s10, the sub-images extracted (at step s8) from the images taken by a camera 10 are stored in sequence (i.e. in time-order) at the storage 13 corresponding to that camera 10.

In this embodiment, the sub-images are stored in sequence. Thus, in this embodiment the stored sequences of sub-images form video of the identified objects of interest, as described in more detail below.

At step s12, on request, the images that were stored at step s4 (i.e. the images taken at time-steps $t_i$, $t_j$, $t_k$, or $t_l$), and the sub-images stored at step s10, are transmitted from the camera module 8 at which the images/sub-images are stored to the other camera modules 8 of the array 4. Thus, in this embodiment information about the identified objects of interests is broadcast between the processors 12, i.e. between the camera modules 8. Moreover, each camera module 8 tracks the positions of each identified object within the field of view of its camera 10. In this embodiment, a conventional object tracking processes is used.

Furthermore, at step s12, on request from the ground base station 40, the image footprints for the images that were stored at step s4 (i.e. the images taken at time-steps $t_i$, $t_j$, $t_k$, or $t_l$), and the sub-images stored at step s10 are transmitted to the ground station 40. The ground station 40 may request images either automatically, or in response to operator intervention, and may request images in either reduced or full resolution.

In this embodiment, once all the images/sub-images containing a particular object of interest have been downloaded by the ground station 40, they are compiled at the ground station 40 into a low frame rate video sequence of that object of interest. In this embodiment, the frame rate of the video of a particular object is 4 frames per second. Also, in this embodiment, a duration of a video of an object depends on whether or not the object is moving relative to the terrain 30, and, if it is moving, with its velocity relative to the aircraft's direction of flight.

Furthermore, at step s12, on request the images that were stored at step s4 (i.e. the images taken at time-steps $t_i$, $t_j$, $t_k$, or $t_l$), and the sub-images stored at step s10 are transmitted to the assembly 6. In this embodiment, the assembly 6 performs an optional additional process of capturing further images or video of particular objects using the received sequences of sub-images, as described below with reference to FIG. 7.

The images stored at step s4 and/or the sub-images stored at step s10 may be sent to the ground station 40 and/or the assembly 6 at the same time, or at different times.

Thus, a method of implementing the camera system 3 in which an objects of interest are identified in images taken by cameras 10 on the aircraft 2 is identified, and a relatively images/video of the objects are generated and provided to other systems (e.g. the ground station 40, which is remote from the aircraft 2, or the assembly 6, which is onboard the aircraft 2).

In this embodiment, an optional additional process by which further images and/or videos of one or more identified objects of interest are captured is performed.

Figure 7:
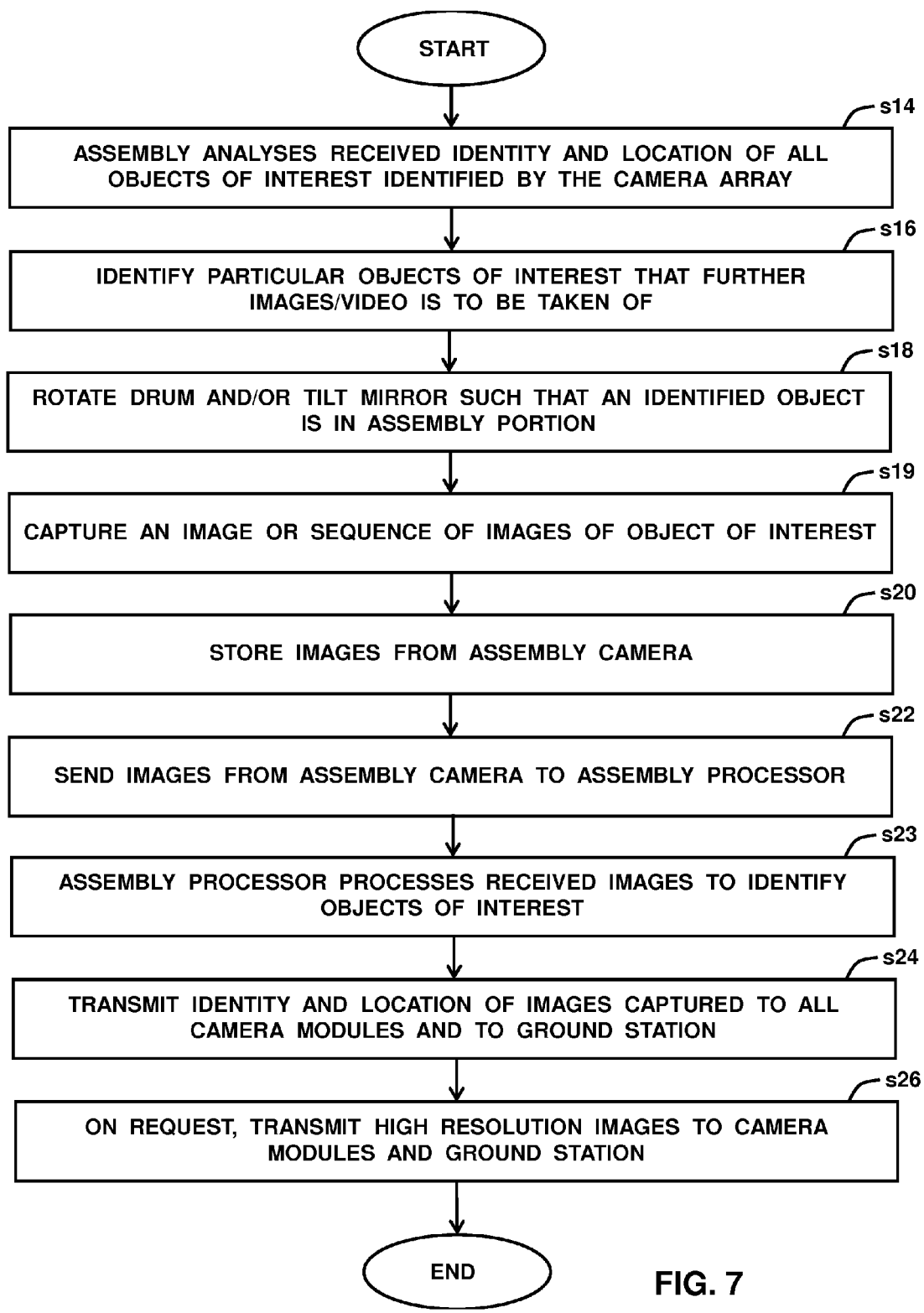
FIG. 7 is a process flow chart showing certain steps of a method of providing relatively high resolution images of a particular object to the ground base.

FIG. 7 is a process flow chart showing certain steps of a method of capturing further images and/or video of identified objects.

In this embodiment, the steps of the process shown in FIG. 7 are performed after those steps shown in FIG. 5, i.e. after performing step s12 described above.

At step s14, the identities and locations of all identified objects of interest that were transmitted to the assembly 6 at step s7, as described in more detail above, are received by the assembly 6 and analysed by the assembly processor 15.

At step s16, the assembly processor 15 identifies one or more particular objects of interest of which further images and/or video are to be taken.

In this embodiment, the assembly 6 (i.e. the assembly processor 15) decides which objects of interest to capture high ground resolution image(s) of.

In this embodiment, this decision by the assembly processor 15 is made solely by the assembly processor 15. The further images and/or video that are to be taken using the assembly 6 could be, for example, a single still image of each object of interest or a sequence of still images (i.e. to provide video) of one or more particular objects of interest.

In this embodiment, the images/video taken by the assembly camera 14 have higher resolution and are taken for a longer duration than those of the cameras 10 of the array 4. In this embodiment, a particular object of interest can be identified, e.g. by the assembly 6 or ground station 40, using the object ID assigned to it at step s6 above (if that object was identified at step s6), or an object could be referenced by its location on the surface of the terrain (e.g. if the object was not identified at step s6 above).

In other embodiments, instructions regarding which object(s) further images and/or video are to be taken of, by the assembly 6, may be provided to the aircraft 2 from an entity remote from the aircraft 2, e.g. the ground station 40. For example, an operator at the ground station 40 may analyse the images and sub-images that were transmitted to the ground station 40 from the aircraft 2 at step s12 above, and identify one or more particular objects of interest and request further images/video of those objects from the aircraft 2.

In this embodiment, at step s16 the assembly processor 15 decides to take a sequence of images of a single particular object of interest to produce video footage of that object of interest.

At step s18, the drum 18 is rotated, and the mirror 16 is tilted, such that the assembly portion 34 (i.e. the area on the surface of the terrain 30 that is imaged by the assembly camera 14) is moved. This is done so that the particular object of interest on the surface of the terrain 30 lies within the assembly portion 34.

In this embodiment, rotating the drum 18 about its axis 24 moves the assembly portion 34 on the surface of the terrain 30 in a direction that is substantially perpendicular to the direction of travel 31 of the aircraft 2 (such directions are indicated by arrows and the reference numeral 36 in FIG. 4 as described above).

In this embodiment, rotating the mirror 16 about the further axis 26 moves the assembly portion 34 on the surface of the terrain 30 in a direction that is substantially parallel to the direction of travel 31 of the aircraft 2 (such directions are indicated by arrows and the reference numeral 38 in FIG. 4 as described above).

At step s19, once the assembly portion has been moved such that an object on the surface of the terrain 30 lies within the assembly portion 34, images/video are taken of that object using the assembly camera 14. In this embodiment, these images have a higher resolution than those images taken by the cameras 10 of the array 4.

In this embodiment, a conventional object tracking process is used so that the assembly camera 14 tracks an object as it moves relative to the aircraft 2. This advantageously tends to provide that a period of time in which the relatively high resolution images are taken of an object is maximised. This period is from a time-step at which the object first coincides with the assembly portion 34, to a subsequent time-step at which either the object is at a position that is not within the field of view of the assembly camera 14 or the assembly 6 is requested to provide images/video of a different target.

Thus, in this way, further images and/or video can be taken of one or more objects of interest identified at step s16 above.

At step s20, the images of the object from the assembly camera 14 are stored in sequence (i.e. in time-order) at the assembly storage 17. This stored sequence of assembly camera images provides a further images/video of the particular object of interest.

At step s22, the images captured at step s18 by the assembly camera 14 are sent to the assembly processor 15.

At step 23, the assembly processor 15 processes the received images to identify an object of interest.

At step s24, the assembly 6 transmits the identity and location of each image captured and stored by the assembly 6 to each of the camera modules 8, and the ground station 40.

At step s6, on request the stored assembly camera images are transmitted from the assembly 6 to the camera modules 8 and/or the ground station 40.

Thus, a method of implementing the camera system 3 in which further (relatively high resolution) images and/or videos of one or more identified objects of interest are captured, and transmitted to the ground station 40, is provided.

An advantage provided by the above described camera array is that the images/video taken of the terrain under the aircraft using the cameras of the array tends to be continuous and covers a relatively large area of the terrain surface. This is provided by the relatively wide field of view of the cameras of the array. Also, this is provided by, at step s4, selecting a sub-set of images from the set of all images taken, such that the sub-set provides continuous coverage of the terrain for storage.

A further advantage provided by the above described system is that the system is modular. In particular, each of the camera modules are separate and distinct modules. Also, the assembly is a separate module to the camera modules of the array. This tends to provides that, if desired, any of the modules of the camera system can be updated, repaired, replaced, or changed independently of the other modules of the system.

Moreover, the modularity of the system tends to provide that additional camera modules can easily be incorporated into the array, or existing camera modules can be removed from the array, as required (e.g. depending on the application or any constraints on the system such as spatial constraints imposed by the aircraft). Furthermore, due to its modularity the array is scalable so that it can be implemented on a variety of platforms.

Moreover, the modularity of the system tends to provide that processing of images etc. is not performed at a central location (i.e. by a central processor). Thus, the number of camera modules that are used in an implementation of the camera system is not limited by the processing capabilities of a central processor.

A further advantage provided by the above described system and method is that of a reduction in memory/storage requirements, and also communication bandwidth requirements, compared with that of a conventional system. This reduction in memory and communication bandwidth tends to be facilitated by not storing the whole of all of the images taken by the cameras of array. In the above embodiments, only a subset of these whole images is stored, e.g. the minimum number of images that provides a continuous coverage of the terrain that the aircraft flies over is stored. In other words, in the above embodiments, the images taken between the time-steps $t_i$, $t_j$, $t_k$, or $t_l$ (i.e. the so called 'intermediate images') are not stored, but a continuous image of the terrain is still stored. Thus, storage requirements tends to be reduced compared to conventional techniques, for example those in which all images captured are stored and/or transmitted to another system. The reduction in memory, and communication bandwidth tends to be further facilitated by only storing and/or transmitting sub-images that contain objects of interest (i.e. as opposed to the whole image that contain the object).

An advantage provided by the assembly is that the components of the assembly tend to be mounted inside a cylindrical drum. This advantageously tends to provide the assembly has a relatively aerodynamic shape compared to conventional systems (e.g. systems in which one or more cameras are mounted in a turret on an aircraft). Thus, problems caused by increased drag or air resistance, or caused by changing an aerodynamic profile of an aircraft by affixing the assembly to it, tend to be alleviated.

A further advantage provided by the above described system and method is that, by using the array of cameras (as opposed to, for example, a camera mounted on turret) is that video of more than one object of interest can be extracted simultaneously from within the field of view of a single camera. Furthermore, the extracted video of objects of interest from all the cameras in the array may be coupled together such that a capability of 'videoing' multiple objects of interest at the same time tends to be advantageously provided.

Apparatus, including the processors 12, storage 13, the assembly processor 15, and assembly storage 17, for implementing the above arrangement, and performing the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 5 and 7 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the camera system is implemented on an aircraft. The aircraft is a UAV. However, in other embodiments the camera system is implemented on a different entity or system. For example, in other embodiments the camera system is implemented on a different type of vehicle (e.g. a manned aircraft, or a land-based vehicle), or a building.

In the above embodiments, the positions of the camera modules are substantially fixed relative to the aircraft. However, in other embodiments the camera modules may be movable relative to the aircraft. For example, in other embodiments the cameras of the camera modules are substantially fixed relative to one another, but are movable (e.g. by mounting on a turret) relative to the vehicle/building they are mounted on.

In the above embodiments, the camera modules are separate modules comprising separate processors. However, in other embodiments the processing of the images captured by the cameras of the array may be performed centrally, i.e. at a central processor. Such a central processor may be onboard the aircraft, or remote from the aircraft. The use of a central processor advantageously tends to reduce the weight and size of the array. However, the above described advantages provided by the modularity of the array tend to be reduced.

In the above embodiments, the array comprises four camera modules, i.e. four cameras each coupled to a separate processor. However, in other embodiments the array comprises a different number of camera modules. In other embodiments, the array comprises a different number of cameras coupled to any number of processors. The number of camera modules, cameras and/or processors may be advantageously selected depending on any spatial/weight limitations or constraints, or depending on the scenario in which the camera system is to be implemented.

In the above embodiments, the cameras of the array are relatively wide field of view, visible light sensors. However, in other embodiments one or more of the cameras of the array is a different type of camera. For example, the cameras of the array could be infrared sensors, ultraviolet sensors, or any other type of sensor or camera.

In the above embodiments, the assembly camera is a visible light camera. However, in other embodiments the assembly camera is a different type of camera. For example, the assembly camera could be an infrared sensor, ultraviolet sensor, or any other type of sensor or camera.

In the above embodiments, the components of the assembly are mounted in a cylindrical drum. Also, the functionality that the assembly portion is movable relative to the portions of the terrain imaged by the cameras of the array is provided by the drum being rotatable about the roll axis of the aircraft, and by a mirror that reflects light being received by the assembly camera. However, in other embodiments the functionality provided by the assembly is provided by different means. For example, in other embodiments, the assembly camera is mounted in a turret that can be operated so as to point the assembly camera in a desired direction.

In the above embodiments, the camera system is implemented in the scenario described above with reference to FIG. 4. However, in other embodiments the camera system is implemented in a different scenario.

In the above embodiments, as the aircraft flies over the terrain, the cameras of the array are arranged to capture images of a strip of the terrain at each of a number of time-steps. In the above embodiments, the strip of terrain is substantially perpendicular to the direction of travel of the aircraft. However, in other embodiments the cameras of the array are arranged differently (i.e. are in a different configuration) so as to capture images of a differently shaped area of the terrain.

In the above embodiments, images are sent from the aircraft to a single ground base. The ground base is remote from the aircraft. However, in other embodiments, images are sent from the aircraft to a different number of ground bases. Also, in other embodiments, images are sent from the aircraft to a different type of entity (e.g. an airborne platform) remote from the aircraft. Also, in other embodiments one or more of the entities that the images are sent to, and/or the requests are received from are not remote from the aircraft, e.g. a pilot of the aircraft, or other onboard system of the aircraft.

In the above embodiments, further images and/or video of one or more particular objects of interest are captured using the assembly, and provided to the ground base, if it is determined by the assembly processor that those one or more objects are of particular interest. However, in other embodiments further images and/or video of one or more particular objects of interest are captured using the assembly, and/or provided to the ground base, if a different criteria is satisfied. For example, in other embodiments high resolution images of a particular object of interest are captured using the assembly, and/or provided to the ground base if it is determined by the processor that the object is moving with relative speed that is above a predefined threshold value, or if a request for high-resolution images is received by the aircraft/assembly from the ground station, or a source other than the ground station.

In the above embodiments, a single camera assembly is used to capture relatively high ground resolution images/video of one or more particular object of interest. However, in other embodiments, a different number of such assemblies are used, e.g. to track and/or provide images/video of a plurality of objects at the same time.

What is claimed is:

1. A method of capturing and processing images of an area of terrain, the method comprising:
   for each of a plurality of time-steps within a time period, using each of a plurality of modular cameras in a camera array, simultaneously generating an image Of a respective portion of terrain, wherein the modular cameras in the camera array have substantially fixed positions relative to each other, and the portions of terrain are such that a whole of an area of terrain has been imaged by an end of the time period;
   processing all images from the modular cameras to identify an object of interest in those images;
   from each image in which the object of interest has been identified, extracting a sub-image containing that object of interest that has not previously been stored;
   selecting a subset of all images, the subset images being the minimum number of images that provides that the whole area of the terrain is covered by the portions of the terrain in the subset images alone;
   whereby the whole area of the terrain is oversampled, having intermediate images generated between the subset images; and
   wherein all images equals the subset images plus the intermediate images.

2. The method according to claim 1, comprising:
   storing the extracted sub-images.

3. The method according to claim 1, wherein each of the modular cameras in the array is coupled to a respective storage means within the modular camera, the method comprising:
   storing an image or sub-image at the storage means corresponding to the modular camera with which the image or sub-image was generated.

4. The method according to claim 1, wherein each modular camera in the camera array is coupled to a respective processor within the modular camera, and the extracting of a sub-image from an image comprises:
   using the processor corresponding to the modular camera with which the image was generated.

5. The method according to claim 1, comprising:
transmitting the selected images from the camera array for use by an entity remote from the camera array.

6. The method according to claim 2, comprising:
transmitting the sub-images comprising an object of interest video from the camera array for use by an entity remote from the camera array.

7. The method according to claim 1, comprising:
using a further camera for generating one or more further images of the object of interest.

8. The method according to claim 7, wherein the camera array is mounted on a vehicle.

9. The method according to claim 8, wherein the vehicle is an autonomous vehicle.

10. The method according to claim 8, wherein the further camera is a gimballed camera that is movable relative to the cameras of the array.

11. The method according to claim 8, comprising:
providing the further camera relative to the modular cameras of the camera array; wherein
the further camera is part of a camera assembly mounted on the vehicle; and
the camera assembly comprises:
a fixture;
the further camera; and
a mirror; wherein
the fixture is arranged to be rotated about an axis;
the further camera is mounted on the fixture such that the further camera has a substantially fixed position relative to the fixture; and
the mirror is mounted on the fixture such that, when the fixture rotates, the mirror rotates; the method comprising:
rotating the mirror relative to the fixture about a further axis, the further axis being substantially perpendicular to the axis; and
detect detecting electromagnetic radiation reflected by the mirror with the further camera.

12. A camera array, comprising:
a plurality of modular cameras having substantially fixed positions relative to each other, each modular camera being arranged to, for each of a plurality of time-steps within a time period, simultaneously generate an image of a respective portion of terrain, wherein the portions of terrain are such that a whole of a given area of terrain has been imaged by an end of the time period; and
one or more processors configured to:
process all images to identify an object of interest in those images;
from each image in which the object of interest has been identified, extract a sub-image containing that object of interest that has not previously been stored;
select a subset of all images, the subset images being the minimum number of images that provides that the whole area of terrain will be covered by the portions of the terrain in the subset images alone whereby the whole area of the terrain is oversampled, having intermediate images generated between the subset images; and
wherein all images equals the subset images plus the intermediate images.

13. The camera array according to claim 12 is mounted on a vehicle.

14. The method of claim 1 is performed by a program or plurality of programs stored on a non-transitory computer-readable medium, arranged for execution by a computer system or one or more processors such that upon execution they cause the computer system or the one or more processors to operate.

15. The program or at least one of the plurality of programs according to claim 14 is stored in a machine readable non-transitory storage medium.

16. The method according to claim 1, wherein the camera array is mounted on a vehicle.

17. The method according to claim 2, wherein each modular camera in the array is coupled to a respective storage means within the modular camera, the method comprising:
storing only an image or sub-image at the storage means corresponding to the modular camera with which the image or sub-image was generated.

18. The method according to claim 17, wherein each modular camera in the array is coupled to a respective processor within the modular camera, and the extracting of a sub-image from an image comprises:
using the processor corresponding to the modular camera with which the image was generated.

19. The method according to claim 18, comprising:
transmitting the selected images from the camera array for use by an entity remote from the camera array.

20. The method according to claim 19, comprising:
transmitting the sub-images from the camera array for use by an entity remote from the camera array.

* * * * *